United States Patent
Boutell

(10) Patent No.: US 7,841,962 B2
(45) Date of Patent: Nov. 30, 2010

(54) AUTOMATIC TRANSMISSION UPSHIFT TIMING

(75) Inventor: Dante T Boutell, Manhattan Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 484 days.

(21) Appl. No.: 11/934,820

(22) Filed: Nov. 5, 2007

(65) Prior Publication Data

US 2009/0118096 A1    May 7, 2009

(51) Int. Cl.
*F16H 59/48* (2006.01)
*G06F 7/00* (2006.01)

(52) U.S. Cl. .................. 477/120; 477/904; 701/55
(58) Field of Classification Search .............. 477/105, 477/106, 107, 109, 110, 111, 115, 120, 904, 477/905; 701/54, 55, 56, 64, 65, 59
See application file for complete search history.

(56) References Cited

U.S. PATENT DOCUMENTS

| 5,323,318 | A | 6/1994 | Hasegawa et al. |
| 5,454,767 | A | 10/1995 | Clausen et al. |
| 5,778,329 | A | 7/1998 | Officer et al. |
| 5,882,276 | A | 3/1999 | Usuki et al. |
| 6,157,886 | A * | 12/2000 | Janecke ............... 701/55 |
| 6,449,547 | B1 | 9/2002 | Kurihara |
| 6,684,144 | B2 * | 1/2004 | Sekii et al. ............ 701/51 |
| 6,689,018 | B2 | 2/2004 | Imamura et al. |
| 6,749,534 | B2 * | 6/2004 | Watanabe et al. ........ 477/107 |
| 6,843,755 | B2 * | 1/2005 | Estebanez et al. ....... 477/107 |
| 7,052,435 | B2 * | 5/2006 | Tabata et al. .......... 477/107 |
| 2002/0165065 | A1 * | 11/2002 | Yu ................... 477/121 |
| 2005/0131612 | A1 | 6/2005 | Noritaka et al. |
| 2008/0103664 | A1 * | 5/2008 | Hata et al. ............ 701/55 |

\* cited by examiner

*Primary Examiner*—Roger Pang
*Assistant Examiner*—David D Le
(74) *Attorney, Agent, or Firm*—Gifford, Krass, Sprinkle, Anderson & Citkowski, P.C.

(57) ABSTRACT

Methods and apparatus for control of a transmission are described, including provision of a shift initiation signal to the transmission when the engine speed attains an initiation point engine speed, the initiation point engine speed being adjustable as a function of a rate of change of engine speed so as to reduce engine speed variability at shift endpoints.

19 Claims, 7 Drawing Sheets

AUTOMATIC TRANSMISSION UPSHIFT TIMING

FIELD OF THE INVENTION

The invention relates to transmissions, in particular automatic transmissions for vehicles.

BACKGROUND OF THE INVENTION

An automatic transmission allows a gear to be selected automatically. An engine typically has an RPM limit (rev limit), and gear selection by the automatic transmission allows the engine speed to be kept within an operating range. As engine speed increases, a transmission shift is initiated at a certain engine speed, which may be termed the shift initiation point (or "initiation point" for conciseness). After the shift is completed (the shift endpoint), the engine speed then drops through the selection of a higher gear.

SUMMARY OF THE INVENTION

Embodiments of the present invention include apparatus and methods for controlling an automatic transmission so as to obtain a more consistent shift endpoint engine speed under a variety of vehicle operating conditions. A transmission shift is typically not instantaneous, so that if the engine speed increases through the duration of the shift, the endpoint engine speed is higher than the initiation point engine speed.

Conventionally, the shift initiation point (or the initiation point engine speed) is a fixed value, which may be set so that the endpoint engine speed does not go above a certain value, such as the rev limit of the engine, even under conditions when engine speed is increasing rapidly. However, the endpoint engine speed then becomes a function of a rate of increase of engine speed over the duration of the shift.

According to examples of the present invention, an improved automatic transmission controller selects an initiation point engine speed that is adjustable according to a rate of change of engine speed. For upshifts, the shift initiation point may be selected so as to obtain a more consistent, in some cases substantially uniform, shift endpoint engine speed.

The shift initiation point may be adjusted according to the rate of increase of engine speed, which may be determined using an engine speed sensor, vehicle speed sensor, or through other measurements correlated with engine speed.

Hence, an example method of controlling an automatic transmission includes selecting a shift initiation point (or initiation point engine speed) that is correlated with a rate of increase of engine speed. For example, the initiation point engine speed can be higher if the rate of increase is lower. Conversely, the initiation point engine speed can be lower if the rate of increase is greater.

Embodiments of the present invention include a controller for a transmission, such as an automatic transmission associated with a vehicle engine, the controller being operable to provide a shift initiation signal to the transmission when the engine speed attains an initiation point engine speed, the initiation point engine speed being adjustable as a function of a rate of change of engine speed so as to reduce engine speed variability at shift endpoints as a function of the rate of change of engine speed. The endpoint engine speed becomes a weaker function of the rate of increase of engine speed, and may be substantially independent of the rate of increase in engine speed.

In some examples of the present invention, the adjustment to shift initiation point is only made for large accelerator inputs. These may be accelerator inputs greater than 50% of the possible accelerator input range, more particularly greater than 70% of the accelerator input range. In other examples, a shift initiation point may be adjustable for any accelerator input. The rate of change of engine speed may be determined during a suitable time period between a large accelerator input and the shift initiation point.

DETAILED DESCRIPTION OF THE PREFERRED EMBODIMENTS

Figure 1:
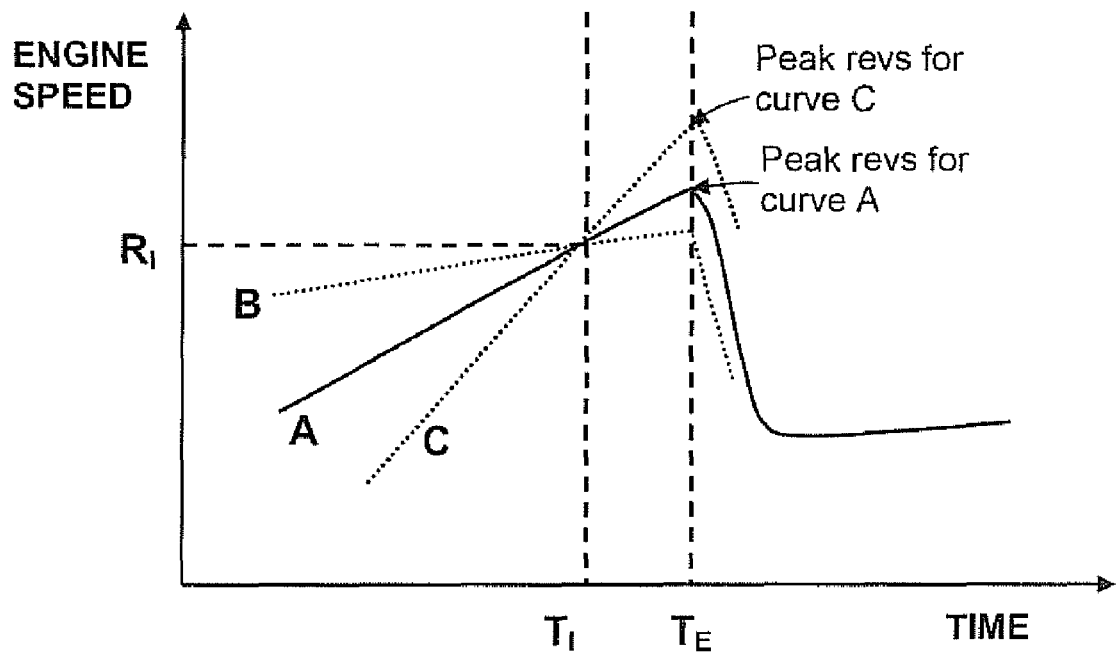
FIG. 1 illustrates operation of a conventional automatic transmission controller.

In some vehicle operating conditions, the rate of increase of the engine speed may be relatively low, even when maximum accelerator input is applied. Such conditions include towing, high altitude operation, climbing hills, or other conditions that limit the rate of increase in engine speed. In such conditions, the endpoint engine speed is conventionally lower than under conditions that allow more rapid engine speed increase. There are several possible consequences. Performance may not be optimized, as the shift may be too early, in that the shift is completed before the engine reaches the rev limit. Engine performance may be better at higher revs, so that an early shift prevents engine operation at revs close to the rev limit.

A driver is not typically aware of the shift initiation point, but the shift endpoint corresponds to an audible drop in engine RPM. Hence, if the engine speed at the shift endpoint is lower than for normal operations, the shift will sound different to the driver. Hence there are drivability consequences related to an early shift. The driver may become concerned about the engine or transmission, particularly as these unusual sounding shifts will conventionally occur in potentially hazardous conditions such as towing or mountainous terrain. Such drivability aspects can be improved using embodiments of the present invention.

Methods and apparatus for control of a transmission are described herein, including provision of a shift initiation signal to the transmission when the engine speed attains an initiation point engine speed, the initiation point engine speed being adjustable as a function of a rate of change of engine speed so as to reduce engine speed variability at shift endpoints.

By adjusting the shift timing based on the rate of engine speed increase, an improved control of shift timing is obtained. The endpoint engine speed may be more consistent, so that a target engine speed at the endpoint can be more readily obtained than using conventional approaches. This may optimize drivability and power performance of the engine. Conventionally, a shift occurs at lower than target engine speeds for a lower rate of engine speed increase. This may be readily discerned by the driver, who will recognize the lower pitch of the engine at the peak engine speed. Even aside from the detriment to performance, the change in tone of peak engine speed may be a cause of concern or otherwise a source of dissatisfaction for the driver.

Embodiments of the present invention allow a wider range of available engine speeds to be used, even under widely varying vehicle operation conditions. By adjusting the initiation point engine speed as a function of a rate of increase in engine speed, this reduces and in some cases can substantially eliminate the dependence of endpoint engine speed on the rate of change of engine speed.

An advantage of some embodiments of the present invention is that the engine performance will sound more consistent to the driver. The driver perceives engine speed (RPM) through the pitch of the engine, and hence a more consistent engine speed at shift endpoints give improved drivability of the vehicle. The vehicle can sound smoother, in addition to performance increase features such as improved fuel economy and/or improved protection of the transmission.

In embodiments of the present invention, shift points may be mapped to engine speeds, for example using a preprogrammed lookup table. Conventionally, the lookup table values will be set at a constant value so as to provide a safety margin to prevent engine over revving. For example the peak engine speed for downhill operation of the vehicle may be set to the target engine speed. However this approach may degrade vehicle performance, such as at high altitudes and when driving uphill, as it may cause a premature shift initiation, and a peak engine speed that is lower than desirable. Hence, in one approach according to the present invention, the lookup table is optimized so as to adjust the shift initiation point as a function of the rate of increase in engine speed. Over running of the engine may be prevented, and performance in high load conditions and at high altitude can be improved.

FIG. 1 illustrates operation of a conventional automatic transmission controller. Lines A, B, and C represent possible variations in the rate of increase in engine speed. The figure shows the engine speed along the ordinate as a function of time. The shift initiation point is shown at $T_I$, and the shift endpoint is at time $T_E$. In a conventional automatic transmission control, the shift initiation point occurs when the engine speed reaches a fixed value, a predetermined engine speed indicated on the figure as $R_I$. Hence, the lines A, B, and C all pass approximately through the point $T_I$, $R_I$.

In this case, the endpoint engine speeds at $T_E$ are a function of the rate of increase in engine speed (the gradient of the linear portions of the curves in this illustration). Curve C represents the fastest rate of increase, in comparison to the other curves, and leads to the highest endpoint engine speed. The shift initiation point may be set so that curve C does not go above a target value, such as the rev limit of the engine.

Curve B represents the lowest rate of increase in engine speed (compared with curves A and C), and leads to an endpoint engine speed that is lower than for curve C. For curve B, the shift endpoint then occurs before the engine speed has reached the target value (such as the rev limit), and the engine speed range between the actual shift endpoint and the rev limit is unavailable. This may degrade engine performance and/or drivability of the vehicle.

For maximum engine performance, it may be desirable to select the shift initiation point of an upshift so that the engine speed reaches a maximum value at the shift end point. It may also be desirable to limit the engine revs to lower than a predetermined rev limit. Embodiments of the present invention allow both of these objectives to be obtained under variable operating conditions, and hence rates of engine speed increase. By adjusting the shift initiation point as a function of the rate of increase in engine speed, the endpoint engine speed can be made more consistent, and in some examples substantially constant. Hence, the functional dependence of the endpoint engine speed on the rate of increase of engine speed may be appreciably reduced, and possibly substantially eliminated. Similarly, the shift initiation point for a downshift can be adjusted as a function of the rate of change of engine speed to obtain endpoint engine speeds, and/or engine speeds in the subsequent gear, close to target values.

Operational conditions such as frictional factors, road load (including road grade), and altitude influence the rate of change of engine speed, even for large accelerator inputs, and the rate of change of engine speed can be used to modify the shift initiation point to obtain improved transmission operation under variable operational conditions.

Embodiments of the present invention allow improved performance or drivability in response to operational conditions such as higher engine friction (e.g. newer engines, higher weight oil, and the like), higher road load (e.g. higher vehicle or cargo weight, headwinds, road grade, friction factors in the wheel bearings, wheels, drivetrain and the like), higher altitude, and/or higher temperatures. The shift initiation point may be adjusted so as to optimize drivability and/or power performance under various driving conditions. By adjusting the shift initiation point as a function of rate of increase in engine speed, a more consistent vehicle performance can be obtained.

In some embodiments of the present invention, the shift initiation point is adjustable as a function of the rate of increase in engine speed so as to improve drivability and/or engine power performance under various operating conditions. In contrast, conventional approaches may optimize performance and drivability for only low load, low altitude operation. Conventionally, upshift timing is optimized for standard conditions such as low altitude and/or low road load driving, giving decreased vehicle performance under conditions such as high altitude and/or higher load driving such as towing. If the shift initiation point is the same engine speed for all conditions, the engine speed range available varies due the duration of the inertial phase of the shift (the duration $\Delta T=T_E-T_I$). However, embodiments of the present invention allow the engine speed range available for high load and/or high altitude conditions to be increased, with shift endpoints occurring at approximately a given target engine speed, such as the rev limit, for various operating conditions.

Figure 2:
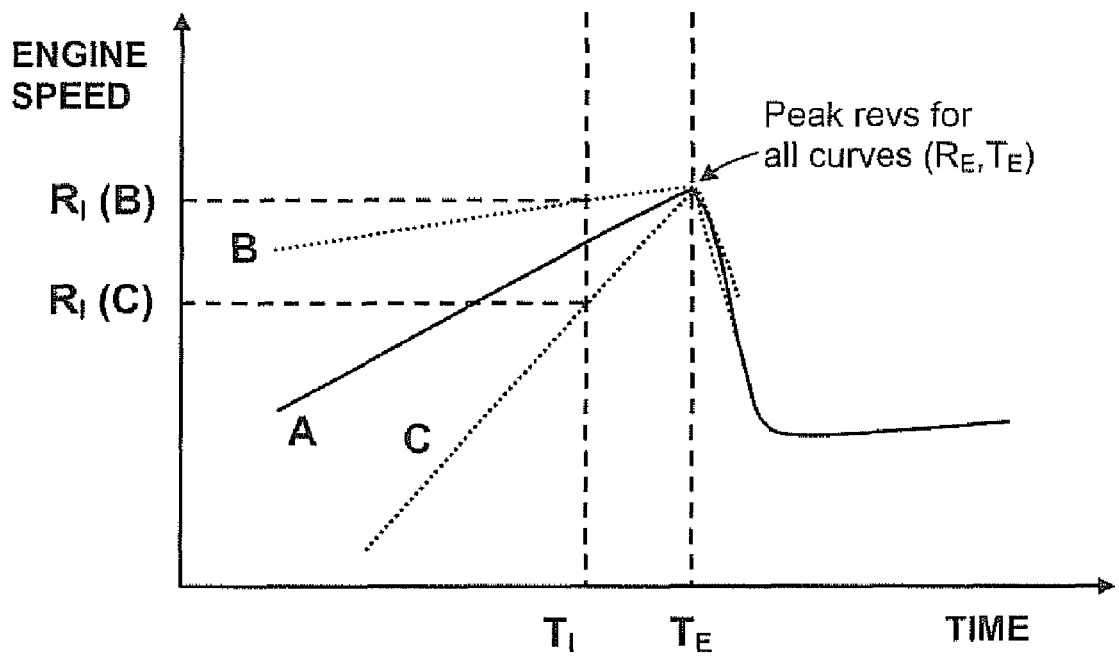
FIG. 2 illustrates operation of an automatic transmission according to an embodiment of the present invention.

FIG. 2 shows lines A, B, and C, representing different rates of engine speed increase. In examples according to the present invention, the engine speed at which the shift is initiated ($T_I$) is adjusted according to the rate of increase in engine speed. For example curve A, representing normal driving conditions, has an initiation point engine speed $R_I(A)$ (not labeled in the figure for clarity). In contrast, line C, corresponding to the highest rate of increase, has an initiation point engine speed at $R_I(C)$, $R_I(C)$ being is lower than $R_I(A)$. Curve B relates to the lowest rate of increase in engine speed, and in this case having an initiation point engine speed $R_I(B)$.

As a result of the adjustment in shift initiation points, the endpoint engine speed (peak revs for each curve) is generally consistent, despite the variation in engine speed increase. The endpoint engine speed $R_E$ has a decreased functional dependence on the rate of increase in engine speed. The various rates of increase in engine speed may correspond to different driving conditions, such as high altitude operation or towing in the case of curve B, or driving with a tailwind or slightly downhill in the case of curve C. The adjustment in shift initiation points indicated in FIG. 2 allows a more consistent endpoint to be obtained in different driving conditions. The initiation point engine speed is selected in a manner correlated with a rate of increase in engine speed.

Hence, an improved method for shift timing of an automatic transmission comprises determining a rate of increase in engine speed, and selecting an initiation point engine speed correlated with the rate of increase in engine speed so as to reduce the dependence of shift endpoint engine speed on the rate of increase. Such an approach allows a more consistent endpoint engine speed to be obtained.

Control logic, such as an algorithm executed by an engine and/or transmission controller, receives data related to the rate of increase in engine speed and adjusts the upshift initiation point by determining the rate of engine speed increase and comparing it to a lookup table. In other examples, the lookup table may be generated dynamically from available data, or other method used to modify the shift initiation point. In a representative example, if the rate of increase in engine speed is lower than calculated table values before an upshift, for example at or near maximum accelerator inputs, then the upshift initiation timing may be adjusted to a higher engine speed, so as to provide vehicle performance comparable with that at more normal conditions. This may better meet drivers' expectations of vehicle performance. Conversely, if the rate of engine speed increase before an upshift is higher than a calculated table value, then the upshift initiation point can be adjusted to a lower engine speed, to provide vehicle performance comparable to that of normal operation. In the latter case, this may protect the engine from over revving.

Upshift duration may be substantially constant at higher road loads, but consistent upshift at or near maximum accelerator inputs may not be achieved as the rate of engine speed increase is lower through the duration of the shift. However, by adjusting the shift initiation point to higher engine speeds, as in this example, the endpoint engine speed is increased for lower rates of increase of engine speed, improving drivability and power performance. The rate of engine speed increase before an upshift can be used to determine the necessary adjustment to upshift initiation time so as to maintain similar drivability and power performance characteristics.

In other examples, the shift duration may be decreased as the engine power decreases, for example for powertrains without compensation logic. In this case, the upshift may again occur at lower engine speeds than for higher (or standard) engine output power. This may also worsen drivability and power performance, by for example completing a shift before peak engine power.

Figure 3A:
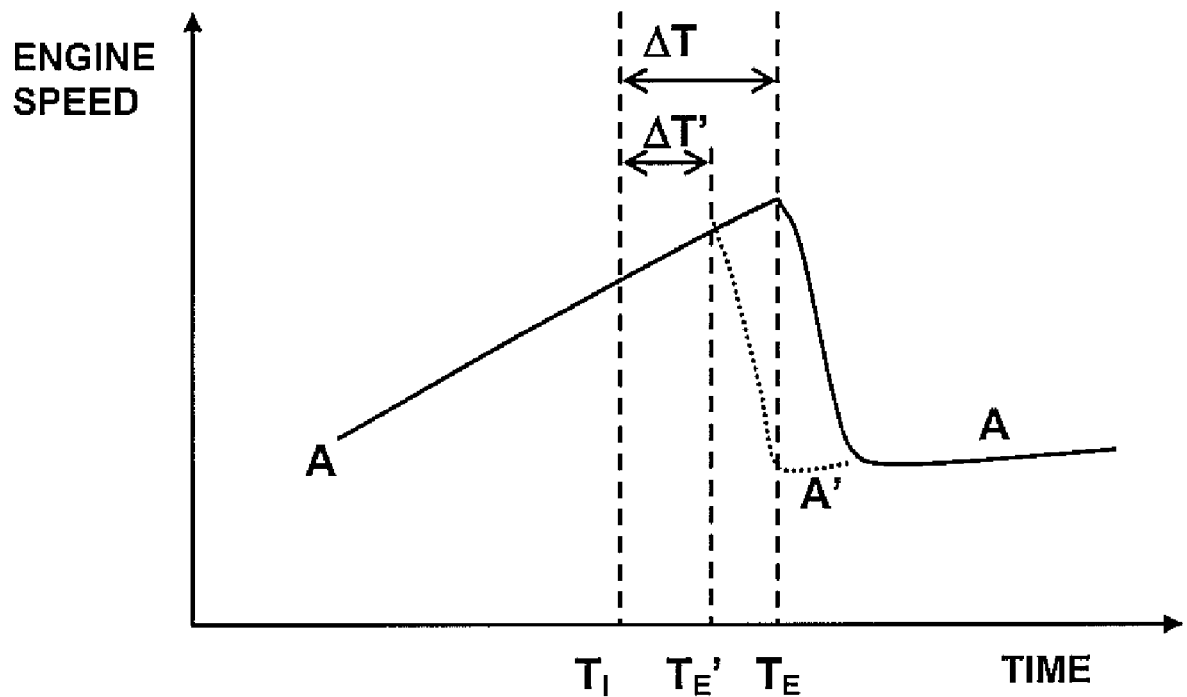
FIG. 3A shows how the shift duration may affect endpoint engine speed.
Figure 3B:
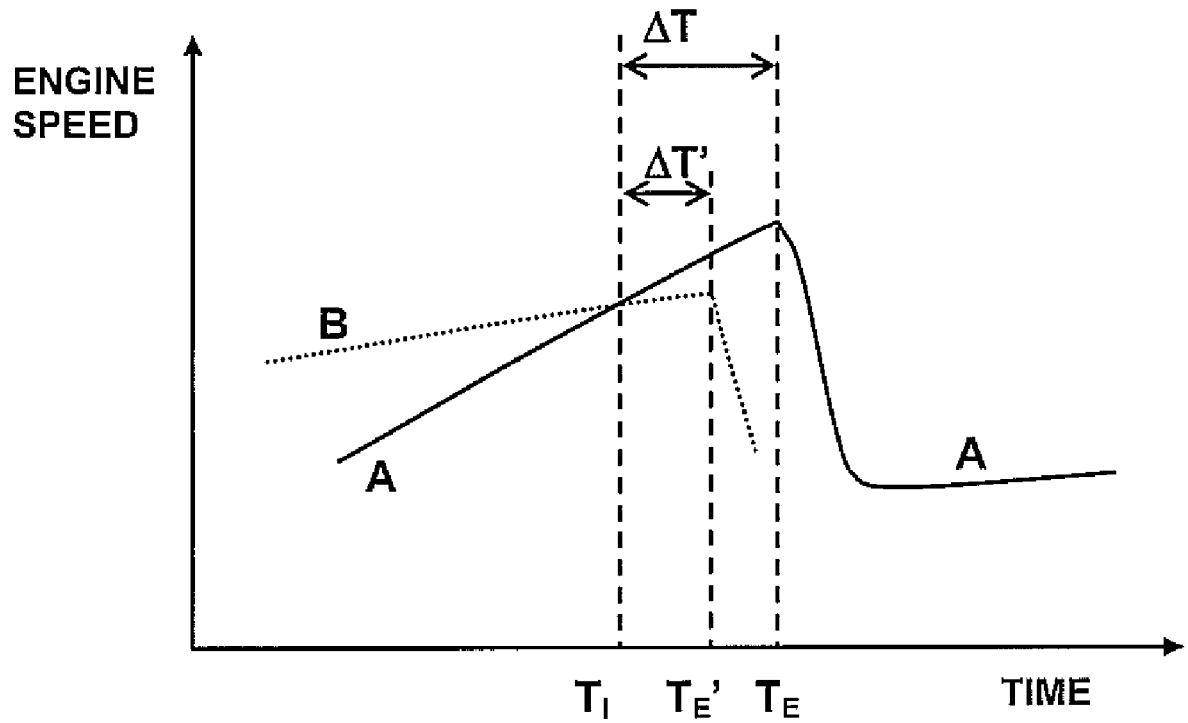
FIG. 3B shows how the shift initiation point may be adjusted to compensate for variations in shift duration.

FIGS. 3A and 3B illustrate how variations in shift duration modify vehicle performance. FIG. 3A shows a curve A with a shift initiated at a time $T_I$ and ending at times $T_E$ or $T_{E'}$. If the shift endpoint is later, the peak engine speed is higher (curve A compared with alternative curve A'). Hence if the shift duration is shorter, the peak engine power is reduced.

FIG. 3B illustrates two curves A and B, showing a peak engine speed that is lower if the shift duration is shorter. In this example, shift duration (shown as $\Delta T$ and $\Delta T'$ in this figure) is a function of rate of increase in engine speed. To compensate for this effect, the initiation point engine speed may further be adjusted as a function of shift duration. The shift duration, as a function of engine speed and/or other parameters, may be previously determined and stored, for example in a lookup table, to allow appropriate corrections to shift initiation point to be made.

Figure 4:
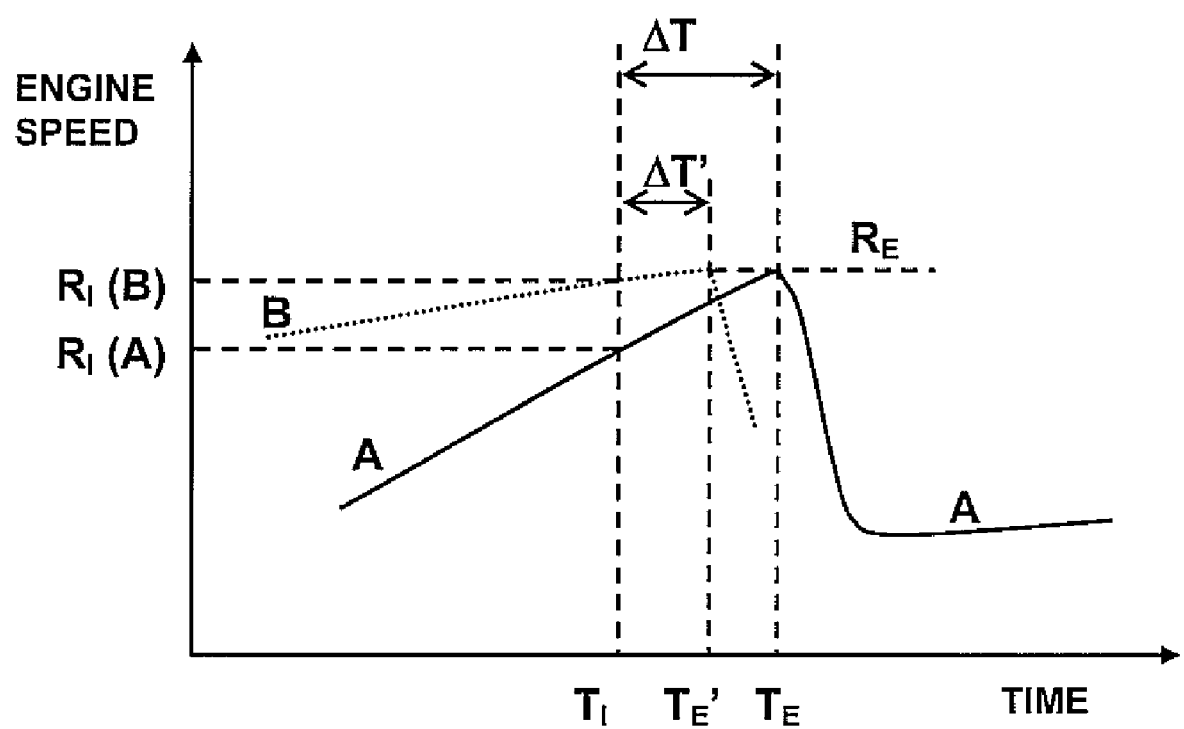
FIG. 4 also shows how variations in shift duration may be accommodated.

FIG. 4 further illustrates that if shift duration varies with engine power, the peak engine speed may be increased by using a shift initiation point at a higher engine speed. The initiation point engine speed is higher for curve B than curve A. The peak engine speed is similar for both curves, shown as $R_E$. This is not possible using conventional approaches.

Figure 5:
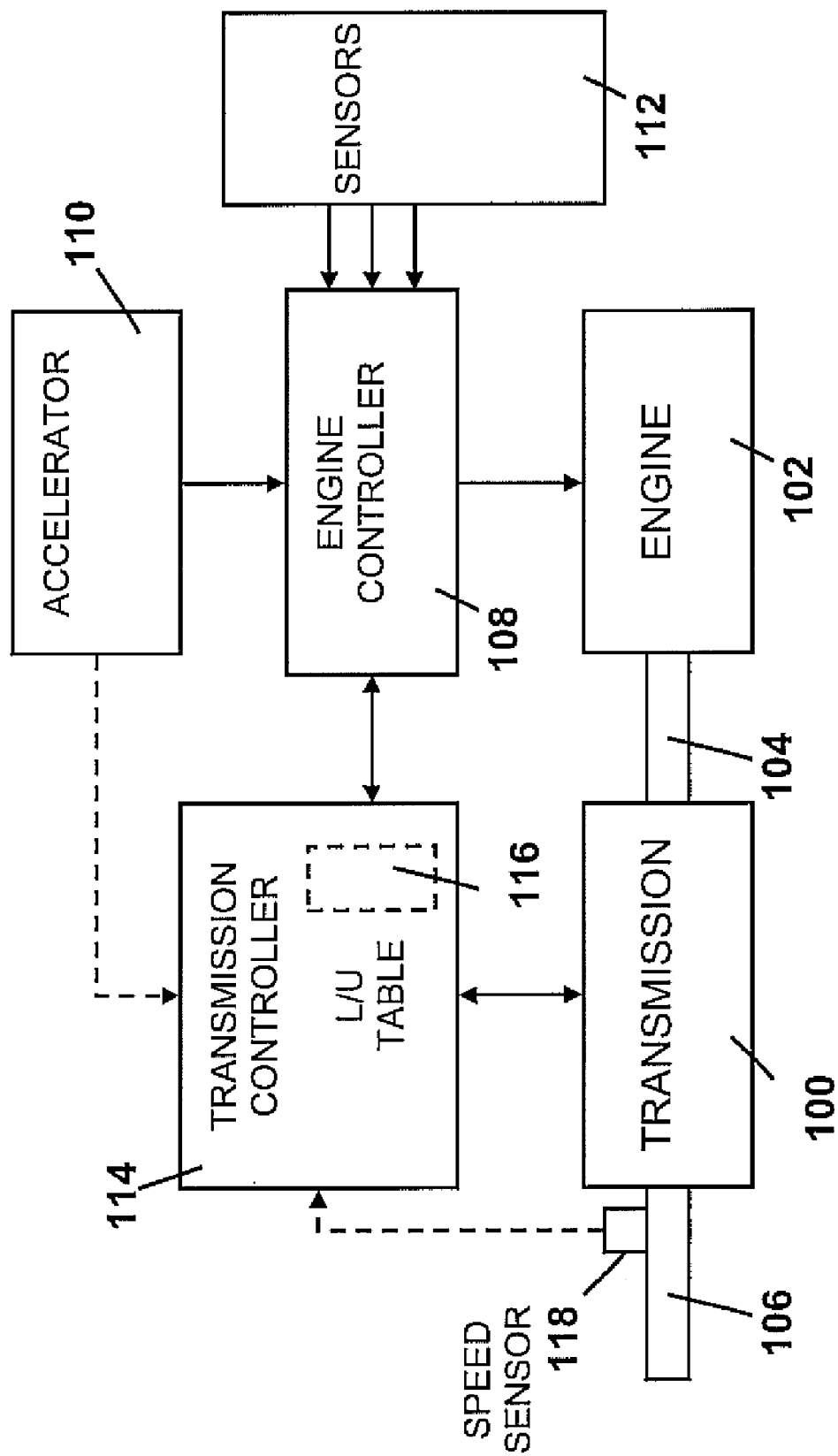
FIG. 5 is a simplified schematic of a transmission controller according to the present invention.

FIG. 5 illustrates a simplified schematic of a transmission control according to an embodiment of the present invention. The figure shows engine 102 with mechanical coupling 104 to transmission 100, the transmission output being at 106. Engine controller 108 receives data from various engine sensors, indicated generally at 112. Accelerator 110 allows the vehicle operator to control engine speed. The engine controller 108 provides engine speed data to the transmission controller 114. The transmission controller uses engine speed data to determine a rate of increase in engine speed. In other examples, the engine controller may provide the rate of increase in engine speed directly to the transmission controller. The rate of increase in engine speed is used to modify a look-up table 116 (or other memory structure) including shift initiation points as a function of engine speed. This memory structure is shown as dashed inset 116 within the transmission controller 114. The transmission controller and/or engine controller may receive vehicle speed data from the speed sensor 118 which may be located at the output of the transmission. Since the vehicle speed is well correlated with the engine speed, for a fixed gear, this may also be used to determine the rate of change of engine speed.

Figure 6:
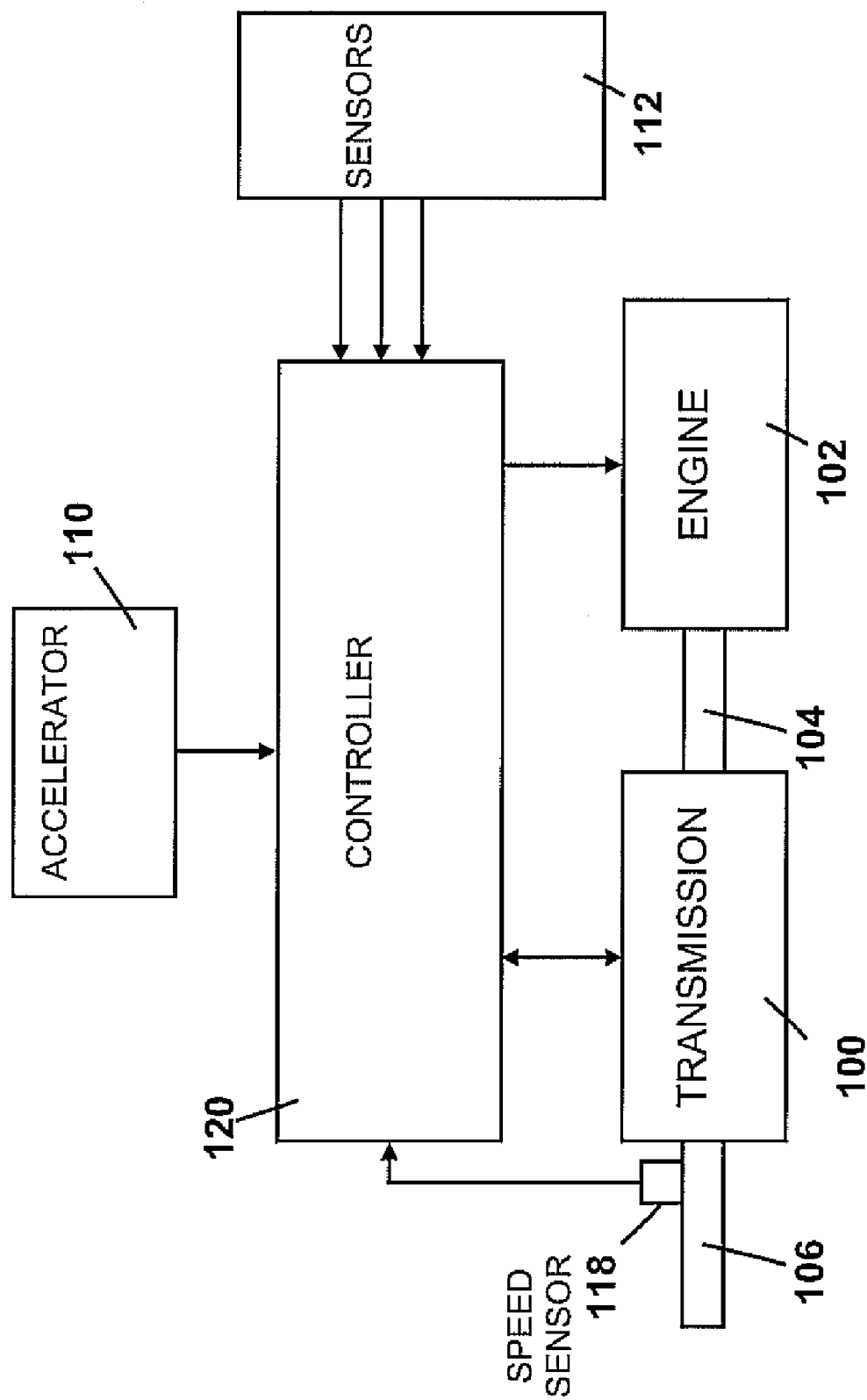
FIG. 6 is a further schematic of an improved transmission controller.

FIG. 6 shows an alternative configuration, in which the engine 102 and transmission 100 have a common controller 120. The controller 120 receives signals from the accelerator 110, and various engine sensors shown generally at 112. These configurations may be similar to those discussed in FIG. 5. The engine controller provides various settings to the engine 102, as indicated by the arrowed line, and also to the transmission 100. In this case, data related to engine speed may be shared between the transmission and engine, as both are controlled by the same electronic circuit, controller 120.

Figure 7:
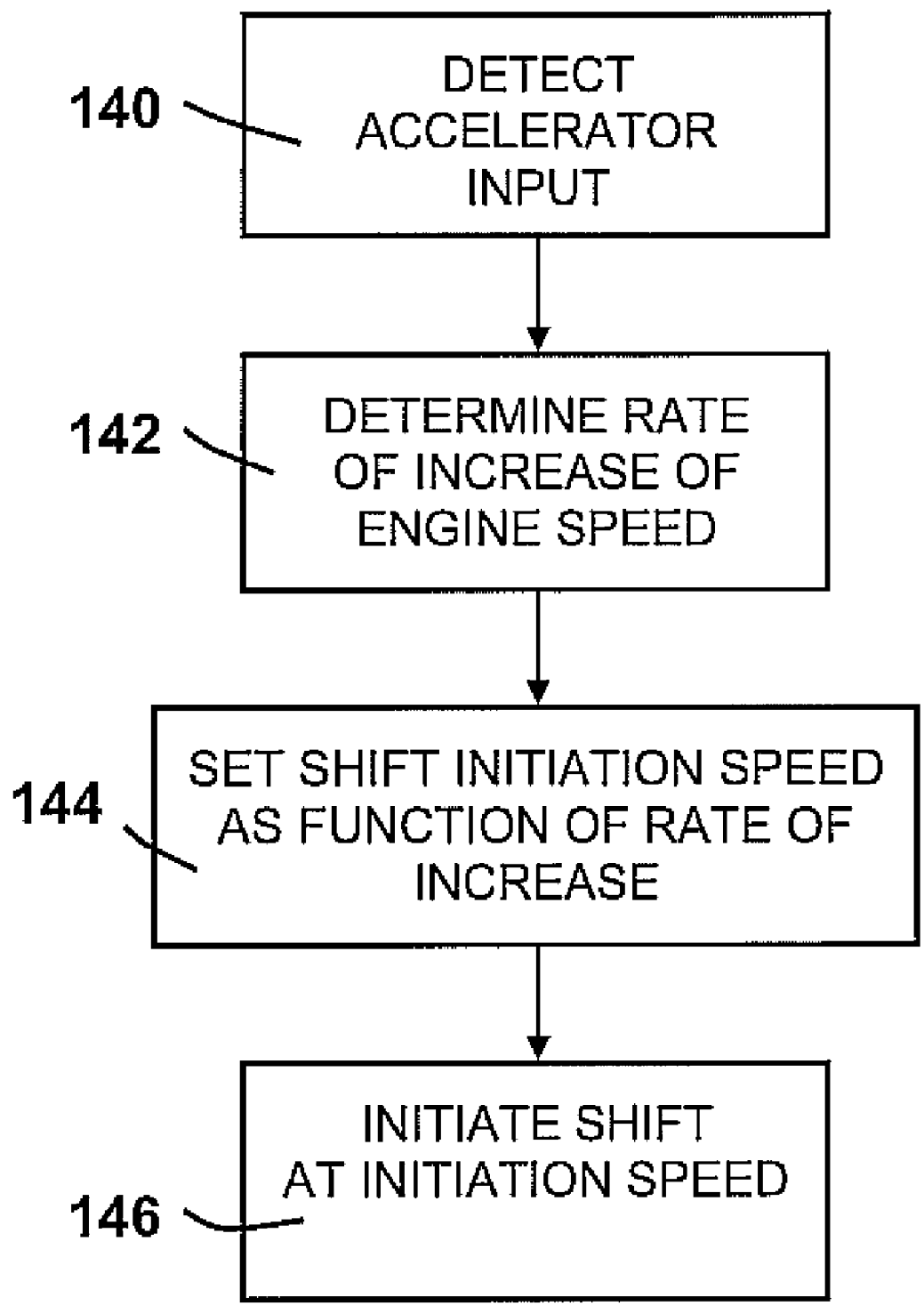
FIG. 7 illustrates a method according an embodiment of the present invention.

FIG. 7 shows an example method according to an embodiment of the present invention. FIG. 7 shows box 140 corresponding to receiving an accelerator input, for example by depression of an accelerator pedal by a vehicle operator. An accelerator input may be a change in accelerator setting, such as a pedal depression, corresponding to the vehicle operator requesting an increase in engine speed. Box 142 corresponds to determining a rate of engine speed increase. In some examples of the present invention, shift initiation point adjustments are only determined for large accelerator inputs, for example large accelerator pedal inputs. Box 144 corresponds to setting a shift initiation point correlated with the rate of engine speed increase. Box 146 corresponds to initiating a shift when the initiation point is reached. For example as the vehicle accelerates, the initiation point is reached at an initiation point engine speed that is modified according to the rate of increase in engine speed.

Figure 8:
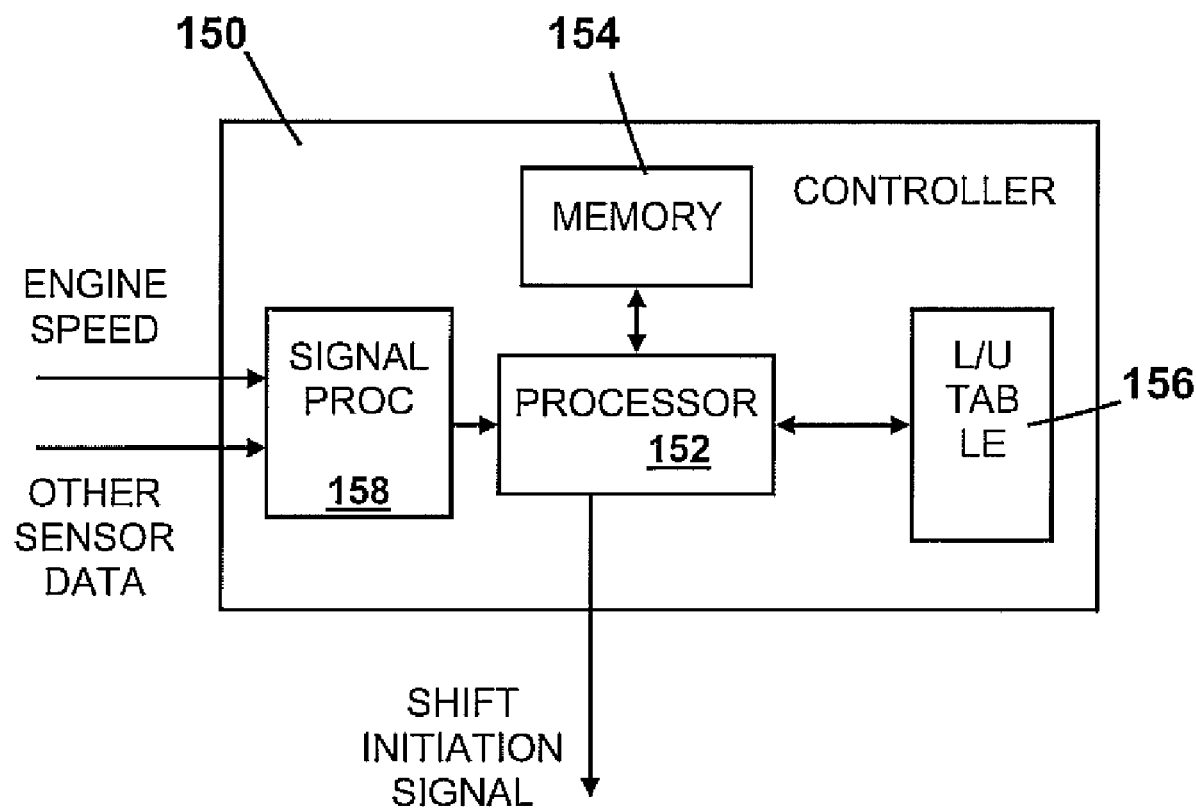
FIG. 8 illustrates possible features of an electronic controller.

FIG. 8 illustrates an example controller 150, comprising a memory 154, processor 152, a look-up table 156 (this may correspond to a separate memory structure, or use memory 154), and signal processor 158 (which may comprise an analog-to-digital converter). An initiation point engine speed in the look-up table may be determined using a constant value stored in non-volatile memory and a correction factor which may be dynamically generated as a function of rate of increase in engine speed. A shift initiation signal is provided to the transmission when the engine speed reaches the initiation point engine speed.

The examples discussed above, in particular in relation to FIGS. 1-4, illustrate a uniform increase in engine speed over time until a shift occurs. In some examples, the gradient of an engine speed against time graph will not be uniform. Engine modeling can be used to predict the behavior of an engine under large accelerator inputs under different load conditions, allowing the initiation point engine speed to be adjusted so as to reduce endpoint variations. In some examples, the rate of change of engine speed may be determined continuously, and an initiation point engine speed dynamically updated at intervals. The rate of chance of engine speed may optionally be determined only after an accelerator input is detected, for example only after a large accelerator input (for example greater than 50% of the available accelerator range, in particular greater than 70% of the available accelerator range).

By modifying the shift initiation point using the rate of increase in engine speed, improved performance can be obtained. The rate of increase of engine speed may be obtained using data obtained from the engine controller. Data may be obtained, directly or indirectly, from a sensor such as an engine speed sensor or vehicle speed sensor. Any measured parameter may be used as long as it is a predictable function of the engine speed.

In some embodiments of the present invention, modification of shift initiation point is only made if a large accelerator input is received. For example, a large accelerator input may be one that is at least 50%, in particular at least 70%, of the available maximum accelerator input. In other examples, adjustments are made for all shifts under all conditions. Shift timing may be adjusted, through control of the shift initiation point, to obtain a substantially consistent endpoint engine speed. In some examples, shift adjustment may use a lookup table having a base value with an additional correction factor that may be positive or negative according to vehicle operation. Limits may be put on the correction factor, to help prevent false conditions from allowing damage to the transmission.

Examples of the present invention include upshift timing adjustment using engine speed (and rate of change of engine speed), in some examples only adjusting the upshift timing for large accelerator inputs. Adjustments may be made for any gear shift initiation point, for example first to second, second to third, and the like.

In some examples, an adjustment to the shift initiation point is only made if the rate of engine speed increase is less than a lower threshold value, and/or greater than an upper threshold value. The lower and upper threshold value may be stored in memory, such as a look-up table. Upper and lower threshold values may be used to define a normal range of engine speed increase, for which no adjustment of the shift initiation point is made. If the rate of increase in engine speed is greater than an upper threshold value, the shift initiation point may be adjusted to a lower engine speed to prevent the endpoint engine speed from exceeding a target value.

The duration of a transmission shift may be known or readily estimated, so that the magnitude of any shift initiation point adjustment may be quantitatively determined. Assuming a linear graph of engine speed increase versus time, adjustments may be simply calculated. However, numerical adjustments may be made for other forms of engine speed time dependencies.

The rate of increase of engine speed may be determined using two or more engine speed determinations. Alternatively, a derivative signal correlated with the rate of increase may be generated, and sampled at any convenient time. Digital and/or analog circuitry may be used. The rate of increase may be sampled over a range of engine speeds, for example during a sampling period after an accelerator input. In some examples, the sampling period may be less than 1 or 2 seconds. An average value of rate of increase may be determined from a plurality of measurements. Corrections to the initiation point may be constrained to within predetermined limits to ameliorate or avoid adverse behavior due to fault conditions.

Examples of the present invention can accommodate for the inertia phase of the shift, which, for example, varies greatly depending on altitude. Aspects of the present invention can be combined with other transmission control features, such as engine and transmission models, and the computational determination of driver intentions. Examples of the present invention allow optimization of power, performance, and consistency as the engine power is engine speed dependent, and further can provide the driver with substantially consistent engine speeds at upshift end points, in particular for at large accelerator pedal inputs, under varying conditions. A driver may perceive inconsistent engine speeds at the end of transmission shifts by way of engine sound and/or tachometer display.

In some examples, a single package may include an engine computer and a transmission controller. In such examples, signals from the engine computer can be readily shared with the transmission control. In other examples, dynamic adjustments may be used to the lookup table used to determine the shift initiation point. The correction factor may be dynamically updated if used for all vehicle operations, or may only be updated for large accelerator inputs, for example large accelerator pedal inputs. The rate of change of engine speed may be obtained from two, three, or more points related to engine speed and time. As few points may be used as consistent with safe operation and reliability.

In other examples, an altitude sensor may be used to modify the shift initiation point. An altitude sensor may be pressure sensor based, GPS based, or use other methods to determine altitude. For example, no correction may be made to a shift initiation point below a threshold altitude. Similarly, a towing sensor may be used to modify shift initiation points.

A controller for a transmission according to an example of the present invention may be an electronic control unit further operable to control aspects of the engine's operation, such as fuel injection quantity, ignition timing, valve timing, and the like. For example, the controller may function as powertrain control unit, receiving sensor data from an accelerator position sensor, oxygen sensor, manifold absolute pressure sensor, air temperature sensor, or other sensor. In other examples, a controller according to an example of the present invention may be an electronic controller in electronic communication with a separate engine control unit, and may exchange data with the engine control unit.

The invention is not restricted to the illustrative examples described above. Examples are not intended as limitations on the scope of the invention. Changes therein, other combinations of elements, and other uses will occur to those skilled in the art. The scope of the invention is defined by the scope of the claims.

Having described our invention, we claim:

1. A controller for a transmission, the transmission being associated with an engine, the controller being operable to provide a shift initiation signal to the transmission when the engine speed attains an initiation point engine speed, the controller being operable to adjust the initiation point engine speed as a differential function of a rate of change of engine speed with respect to time, so as to reduce dependence of an endpoint engine speed on the rate of change of engine speed.

2. The controller of claim 1, wherein the shift initiation signal induces an upshift by the transmission.

3. The controller of claim 1, the controller being operable to adjust the initiation point engine speed so as to obtain an endpoint engine speed substantially independent of the rate of change of engine speed.

4. The controller of claim 1, wherein the controller is adapted to receive a signal correlated with the engine speed, the controller being operable to determine the rate of change of engine speed from the signal correlated with the engine speed.

5. The controller of claim 1, wherein the controller is operable to receive a signal correlated with the rate of change of engine speed.

6. The controller of claim 1, wherein the transmission is an automatic transmission for a vehicle.

7. The controller of claim 1, the controller being operable to receive a signal correlated with an accelerator input, the controller adjusting the initiation point engine speed only for an accelerator input greater than a threshold accelerator input.

8. The controller of claim 7, wherein the threshold accelerator input is an accelerator input greater than 50% of a maximum accelerator input.

9. The controller of claim 7, wherein the threshold accelerator input is an accelerator input greater than 70% of a maximum accelerator input.

10. A vehicle powertrain including the controller of claim 1, the vehicle powertrain including the transmission, the engine, and the controller.

11. A controller for a transmission, the transmission being an automatic transmission associated with a vehicle engine, the controller being operable to provide a shift initiation signal to the transmission so as to induce a shift,
the shift initiation signal for an upshift being provided at an initiation point engine speed,
the initiation point engine speed being determined as a differential function of a rate of change of engine speed with respect to time, so as to reduce an endpoint engine speed dependence on the rate of increase of engine speed.

12. The controller of claim 11, wherein the initiation point engine speed is determined so as to substantially eliminate dependence of the endpoint engine speed on the rate of increase of engine speed.

13. The controller of claim 11, wherein the controller is an electronic control module comprising a processor and a memory, the initiation point engine speed being determined using a constant value stored in memory and a correction factor that is generated as a function of the rate of increase of engine speed.

14. The controller of claim 13, wherein the controller is further operable to receive an accelerator signal correlated with an accelerator input, the correction factor being zero unless the accelerator input is greater than a threshold value.

15. The controller of claim 14, wherein the threshold value is an accelerator input greater than 50% of the maximum accelerator input.

16. A method of controlling a transmission, the transmission being coupled to an engine, the method comprising:
initiating a transmission shift at an initiation point engine speed, the transmission shift being an upshift, the initiation point engine speed being adjusted as a differential function of a rate of change of engine speed with respect to time so as to reduce dependence of an endpoint engine speed on the rate of increase of engine speed.

17. The method of claim 16, further comprising:
determining the rate of increase of engine speed using a speed signal, the speed signal being provided by an engine speed sensor or a vehicle speed sensor.

18. The method of claim 16, further comprising:
determining the initiation point engine speed as a sum of a constant value and a correction factor, the correction factor being a function of the rate of increase of engine speed.

19. The method of claim 16, further comprising detecting an accelerator input;
the initiation point engine speed only being adjusted as a function of the rate of increase of engine speed if the accelerator input is greater than a threshold value,
the threshold value being at least 50% of a maximum accelerator input.

* * * * *